Jan. 18, 1949.　　　C. M. BEYER ET AL　　　2,459,679
SOUND RANGING TRAINING APPARATUS
Filed April 8, 1946　　　4 Sheets-Sheet 1

INVENTORS
CARLTON M. BEYER
ERNEST M. BOLZE

BY

ATTORNEY

Jan. 18, 1949.  C. M. BEYER ET AL  2,459,679
SOUND RANGING TRAINING APPARATUS
Filed April 8, 1946  4 Sheets-Sheet 2

Inventors
CARLTON M. BEYER
ERNEST M. BOLZE
By
M. A. Hayes
Attorney

Jan. 18, 1949. C. M. BEYER ET AL 2,459,679
SOUND RANGING TRAINING APPARATUS
Filed April 8, 1946 4 Sheets-Sheet 3
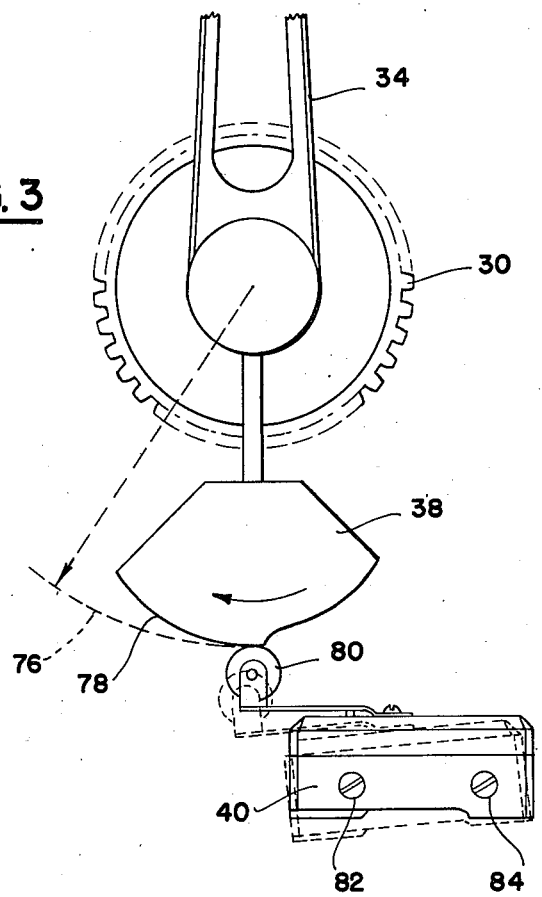
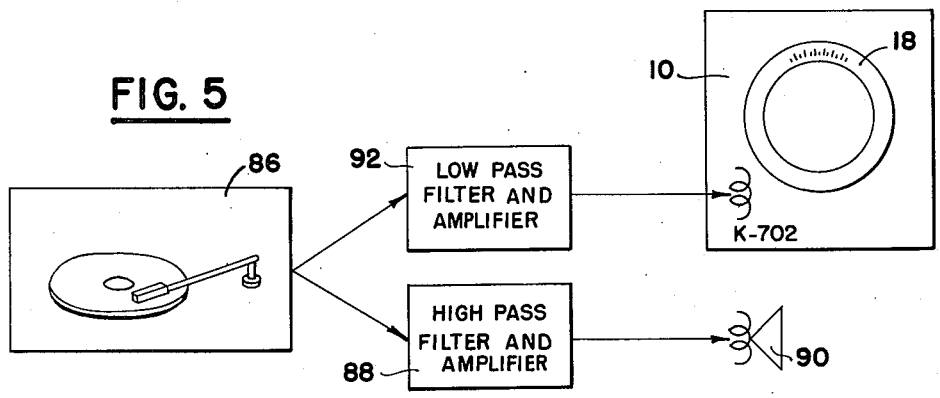
*INVENTORS*
CARLTON M. BEYER
ERNEST M. BOLZE
BY
*ATTORNEY*

Jan. 18, 1949.   C. M. BEYER ET AL   2,459,679
SOUND RANGING TRAINING APPARATUS
Filed April 8, 1946   4 Sheets-Sheet 4

INVENTORS
CARLTON M. BEYER
ERNEST M. BOLZE

BY *M. A. Hayes*
ATTORNEY

Patented Jan. 18, 1949

2,459,679

UNITED STATES PATENT OFFICE 2,459,679

SOUND RANGING TRAINING APPARATUS

Carlton M. Beyer and Ernest M. Bolze, San Diego, Calif., assignors to the United States of America as represented by the Secretary of the Navy Application April 8, 1946, Serial No. 660,320

3 Claims. (Cl. 35—1)

1

The present invention relates to range indicators that are used with underwater sound equipment.

Echo ranging equipment is used aboard ship for locating objects in the water. It radiates "pings" or short pulses of supersonic sound into the water and receives echoes. The transmission and reception are restricted to a small arc so that echoes are received from substantially only one direction. Since the speed of sound in water is known, the elapsed time from the transmission of the ping to the return of its echo is a direct measure of the distance of the reflecting object.

Surface warships use echo ranging for hunting submarines. Submarines use it for measuring the range of surface craft and also for navigation. Such equipment arranged to receive echoes off the ocean bottom serves as a fathometer.

One commonly used plan for obtaining accurate measurements of range consists in employing a continuously rotating, clock-like indicator, graduated in yards, having a range scale over which an indicator hand, or light, moves. This indicating device "keys" the transmitter, that is it causes the ping to be transmitted, just as the indicator light passes the zero mark of the scale. The operator then listens for the echo and reads off the range by observing the position of the light with respect to the range-scale at the instant that he hears the echo.

Much of the training for operators of such equipment can be given effectively on shore-based apparatus that simply simulates the seagoing equipment and the sounds that it emits. On one such training devices, which is shown and described in application Nye et al., Ser. No. 675,860, filed June 11, 1946, characteristic sea sounds are reproduced by phonograph. It is desirable that such sounds be synchronized with the operation of an indicator just as they are in operation aboard ship, but a range indicator cannot conveniently be made to control the time of occurrence of phonograph sounds in the way that the indicator controls the transmissions at sea.

The present invention overcomes this difficulty. It provides a range indicator of the rotating type that can be controlled by other equipment so as to operate in substantial synchronism therewith, and provides new and novel driving and control apparatus therefor. These and other objects and advantages will appear from the following description. In the drawings:

Figure 1 is a front view, partly broken away, showing a rotatable indicator employing the present invention.

2

Figure 3 is a detail view and diagram for explaining part of the operation.

Figure 5 is a block diagram showing training apparatus that includes the indicator of Figure 1.

Figure 1:
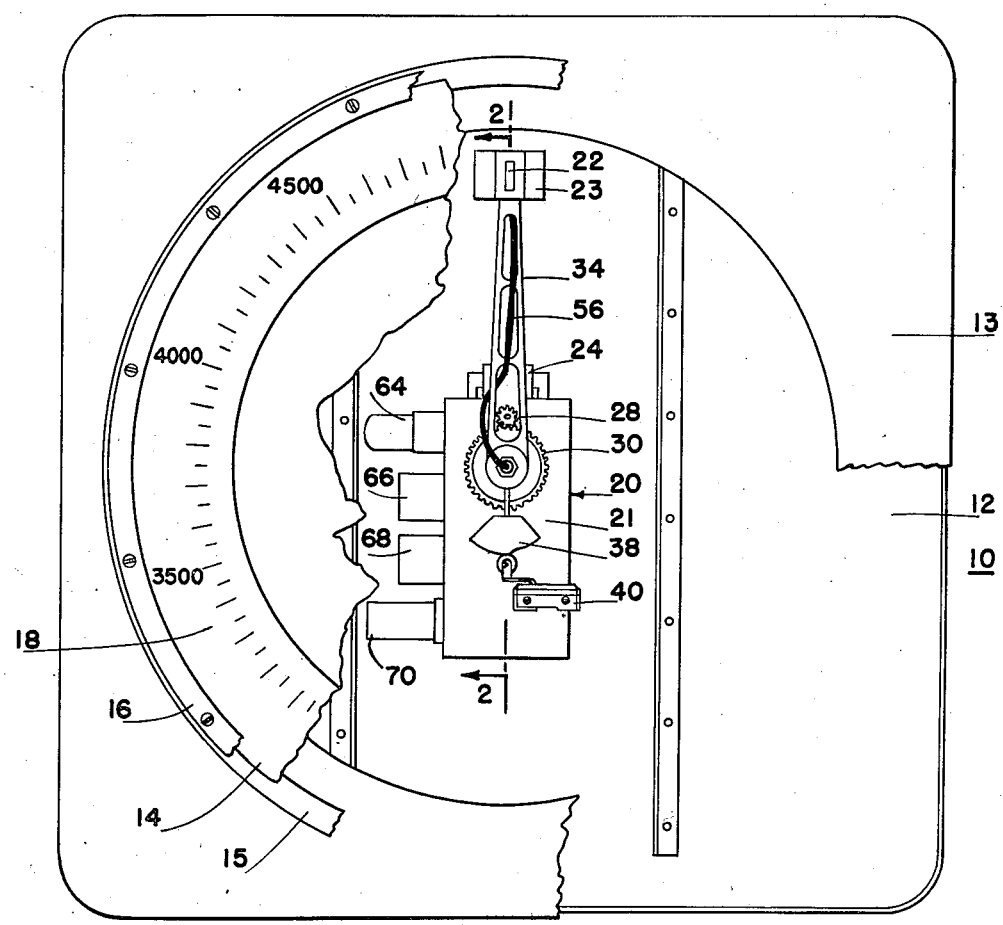
Figure 2:
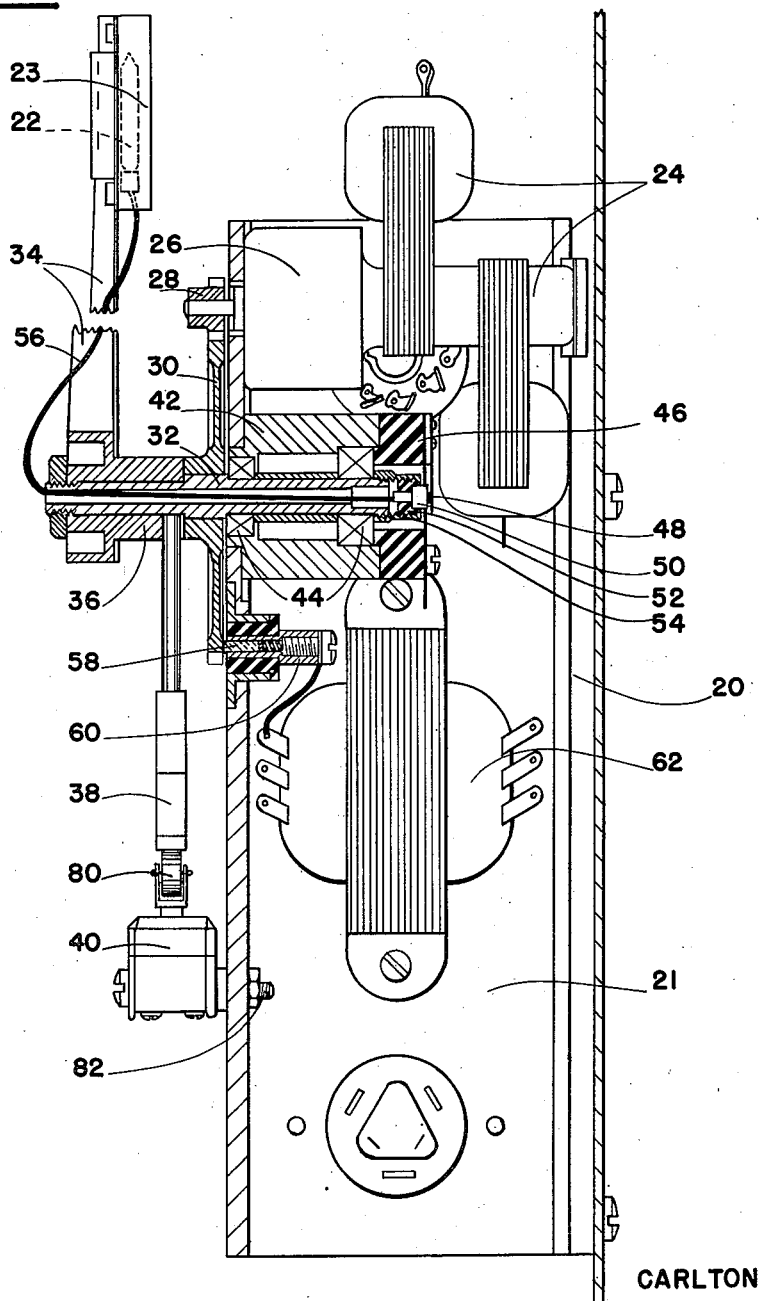
Figure 2 is a sectional view taken along the line 2—2 of Figure 1.

In Figures 1 and 2, an indicating device 10 is mounted in a case comprising a box 12, a cover 13, and a transparent face 14 on which is marked a range scale 18. An internal mechanism 20 moves a light 22 around this scale.

The mechanism 20 is supported on a channel-shape frame 21. It includes a synchronous A. C. electric motor 24 which, through a self-contained reduction gear 26 and pinion 28, drives a gear 30 and hollow shaft 32 to rotate arm 34 that carries the lamp 22 and also a mask or shield 23. The hub 36 of arm 34 carries a counterweight 38 which also serves as a cam for operating an electric switch 40. In Fig. 2, a turned fitting 42 supports the ball bearings 44 for the shaft 32 and supports also an insulating block 46 that carries a spring mounted contact 48. This contact bears against another contact 50 supported in an insulator 52 carried by a cap 54 on the end of shaft 32. Connected to contact 50 is an insulated wire 56 which leads out through the central bore of shaft 32 and along arm 34 to conduct current to lamp 22. The return circuit is made through arm 34, shaft 32 and gear 30 to a bush contact 58 in a terminal 60. Mounted also on the frame 21 are an electric transformer 62 seen in Fig. 2, and also rectifier tube 64, relays 66 and 68, and filter capacitor 70 seen in Fig. 1.

Figure 4:
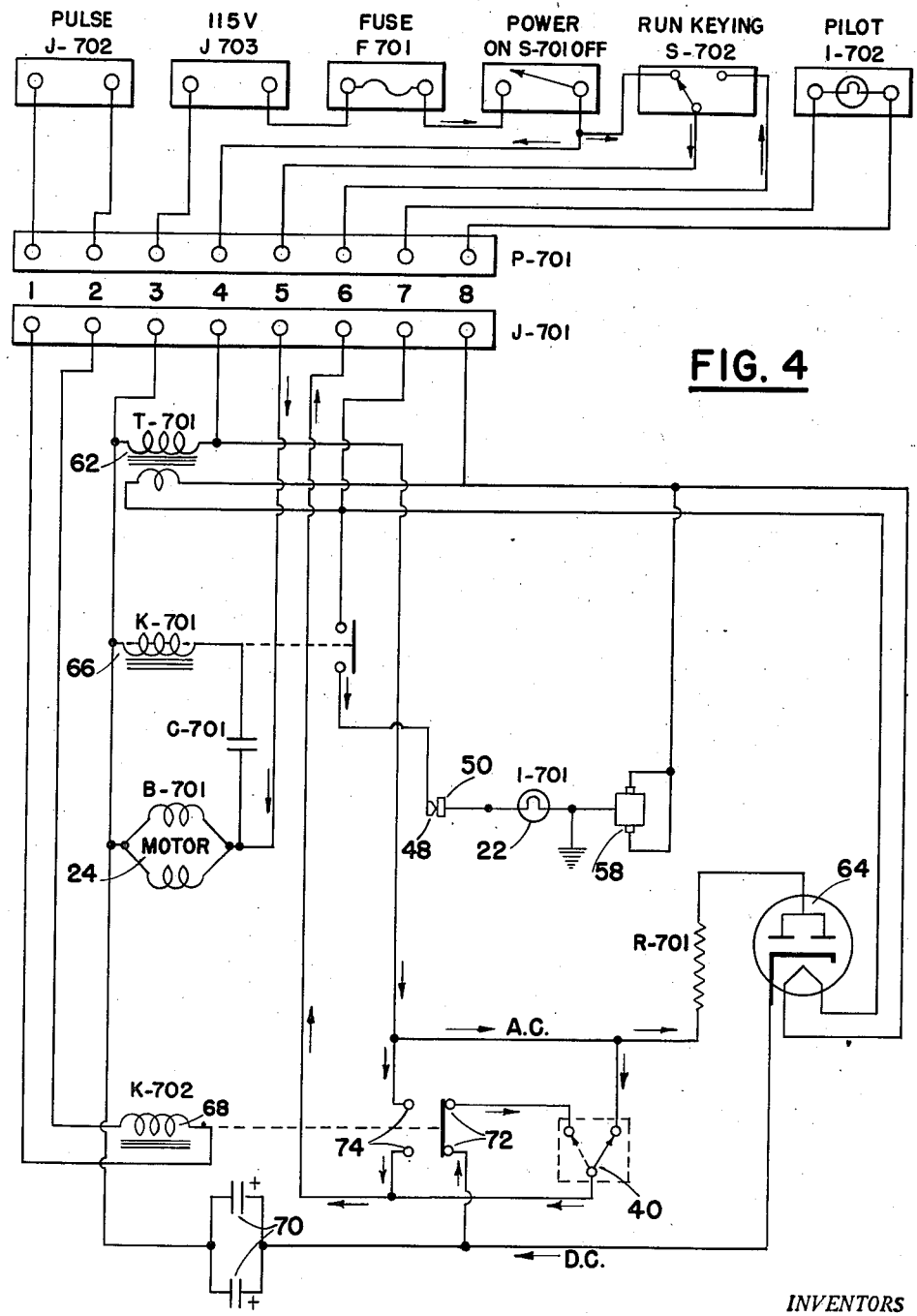
Figure 4 is a schematic diagram of the electric control circuits.

Fig. 4 shows the electric circuits. There two groups of equipment are connected together by mating plug P—701 and jack J—701. The terminals, switches etc., connected to P—701 may be mounted directly on the box 13, so that the plug and jack arrangement permits the easy removal of the complete mechanism 20.

A. C. power is supplied to the terminals of J—703, and goes through fuse F—701 and on-off switch S—701 to terminals 3 and 4 of P—701 and thence to transformer 62 which furnishes low voltage for the heater of rectifier tube 64, indicator lamp 22, and a pilot lamp I—702. A. C. power is supplied also through resistor R—701 to rectifier tube 64 to provide D. C. Resistor R—701 protects tube 64 against overload and also acts with capacitor 70 for filtering the D. C.

Power to the driving motor 24 is supplied through a switch S—702 which, when in the left position as shown, supplies A. C. to it so that it runs continuously and moves the lamp 22 around the scale continuously and at a uniform speed. This operation is useful for tests and demonstrations of the equipment. It also permits the indicator to be used as a clock for timing the sound of propeller beats. When switch S—702 is thrown to the right, power to motor 24 is controlled by relay 68 and switch 40. Assume that the arm 34 is out of the zero position (in which it is shown in Fig. 1). Then switch 40 will lie in the solid-line position of Fig. 4 to supply A. C. to motor 24 to drive it. As arm 34, rotating clockwise, again comes into the erect (or zero) position, counterweight 38 (Fig. 1) actuates switch 40 to throw it to the dotted-line position shown in Fig. 4. In this position of switch 40, D. C. flows from rectifier tube 64 through the contacts 72 (now closed) of relay 68, and through switch 40 to motor 24. This D. C. abruptly stops motor 24 and holds the arm 34 erect with lamp 22 at the zero position of scale 18.

The reason that the D. C. is effective for stopping the motor should be apparent from a consideration of the action of the magnetic field in an A. C. motor. The A. C. excitation produces a magnetic field that either rotates or alternates, but which causes the armature to tend to follow it. The D. C. excitation simply causes the magnetic field of the motor to stop so that the armature, since it tends to follow the field, stops too.

The motor 24 may be started again by a brief application of power to the terminals of J—702 for energizing relay 68. When this relay operates, it opens its contacts 72 to remove the D. C. from motor 24 and closes its contacts 74 to apply A. C. to it. Arm 34 (Fig. 1) is thereby put into motion, and counterweight 38 moves away from switch 40 so that its contacts return to the full-line position in Fig. 4. In this position, the contacts of switch 40 shunt the contacts 74 of relay 68 to maintain the A. C. energization of motor 24 and also open the D. C. path, (which is also open at contacts 72).

If relay 68 is kept energized, A. C. will be supplied continuously to motor 24, through contacts 74, and open contacts 72 will prevent the application of D. C. to the motor so that the motor will run continuously. When relay 68 is de-energized, it opens contacts 74 and closes contacts 72 so as to give control of motor 24 back to switch 40. Switch 40 then stops the motor, as already described, the next time the arm 34 reaches the erect position.

Relay 66 controls the power to the indicator lamp 22. It is energized thorugh condenser C—701 from the same circuit that supplies motor 24. Accordingly, relay 66 is energized only when motor 24 is supplied with A. C. Consequently, the indicator lamp 22 lights up only when it is in motion.

Fig. 3 shows the construction that permits arm 34 to be stopped accurately in the erect position. This precise operation requires first, accurate repeat-operation of the switch 40 so that the arm will stop consistently at one position, and second, provision for adjustment of that position.

In Fig. 3, the dotted line 76 is an arc about the center of shaft 32, that is about the axis of rotation of arm 34 and cam 38. The leading cam-face 78 of counterweight 38 approaches this line 76 continuously and smoothly. Therefore, as the cam moves (from the right) into the position shown in Fig. 3, it depresses the actuating roller 80 of switch 40 with a smooth motion. Switch 40 is a precision snap switch of the type shown in Patent 1,960,020 and available commercially under the name micro switch. This switch is precise in that it always snaps at the same depressed position of its actuating roller 80. Furthermore, this switch requires only about .01 second for its snap operation, and this time is substantially constant.

Consequently, arm 34 is always at substantially the same position when switch 40 applies D. C. to the motor 24 for stopping it. To adjust this stopping position so as to make arm 34 stop erect, the position of switch 40 may be changed. Its mounting bolt 82 has a loose fit in frame 21 (Fig. 2) and permits the switch to be turned slightly about screw 84, as indicated by the dotted lines in Fig. 3. Moving the left end of switch 40 up makes it meet the cam earlier so that the arm 34 stops farther to the left.

Fig. 5 shows diagrammatically, training apparatus using the device of Figs. 1, 2 and 4. A phonograph 86 reproduces actual sea sounds including the pings, echoes, etc. of echo ranging operations. Superimposed on the recording are short, low-frequency tones, as for example, 75 cycle tones each lasting one second, for keying the indicator 10. A high-pass filter 88 excludes this keying tone from the speaker 90 to which the student is listening, and a low-pass filter 92 passes only this keying tone for energizing the starting relay K—702 (see Fig. 4) of the indicator 10.

Thus, the recorded 75 cycle keying tone starts lamp 22 moving around the scale 18 just when the student hears the sounds of the transmission. Then he reads the range as indicated by the position of lamp 22 at the instant he hears the echo. The range scale 18 is graduated for 5000 yards, and to match this scale, arm 34 makes one revolution in 6.25 seconds. If the echo reproduced by the phonograph 86 occurs more than 6.25 seconds after the "ping" (corresponding to a range greater than 5000 yards) the phonograph record must have a second 75 cycle keying tone that begins, say 6 seconds after the "ping," and overlaps the actuation of switch 40 so that relay K—702 will maintain the A. C. energization of motor 24 and cause arm 34 and lamp 22 to go on into a second revolution.

Repeated "pings" and their accompanying 75 cycle keying pulses should be spaced on the phonograph record slightly more than 6.25 seconds apart so that arm 34 may come to a stop and then start anew at each "ping" to thereby automatically stay in step with the recording.

The indicator of the present invention may also be used aboard ship to indicate ranges without having to control the pinging. Thus it may serve as a repeater in an echo ranging system of the type heretofore used.

Although here illustrated by a specific embodiment, the invention should be limited only by the appended claims.

We claim:

1. In a sound ranging training apparatus, means for producing a plurality of high frequency sound impulses simulating a signal and its echo, means for producing a low frequency control impulse simultaneously with said high frequency signal simulating impulse, a motor, means responsive to said low frequency impulse to start said motor, an indicator normally in a zero position rotatable by said motor, and means for de-energizing said motor when the indicator returns to said zero position after production of said high frequency echo simulating impulse.

2. In a sound ranging training system, means for producing a plurality of high frequency sound impulses simulating a signal and its echo, means for producing a momentary low-frequency control impulse simultaneously with said high frequency signal simulating impulse, an alternating current motor, means responsive to said low frequency impulse to supply alternating current to said motor, an indicator normally in a zero position rotatable by said motor, means responsive to displacement of said indicator from said zero position for maintaining the supply of alternating current to the motor, and means for deenergizing the motor and applying direct current to its windings when the indicator returns to said zero position after production of said high frequency echo simulating impulse.

3. The sound ranging training apparatus of claim 2 including, a lamp carried by said indicator, and means responsive to energization of said motor by alternating current for energizing the lamp.

CARLTON M. BEYER.
ERNEST M. BOLZE.

REFERENCES CITED

The following references are of record in the file of this patent:

UNITED STATES PATENTS

| Number | Name | Date |
| --- | --- | --- |
| 1,409,794 | Spitz | Mar. 14, 1932 |
| 2,032,893 | Settegast et al. | Mar. 3, 1936 |
| 2,242,812 | Brown | May 20, 1941 |